Aug. 2, 1960

C. R. HAGEN 2,947,571

DUMP-BODY ASSEMBLY AND ATTACHING MEANS
FOR COMPLEMENTARY TRACTOR

Filed Sept. 30, 1954

INVENTOR
CLARENCE R HAGEN

ATTORNEY

INVENTOR
CLARENCE R. HAGEN
ATTORNEY

Aug. 2, 1960

C. R. HAGEN 2,947,571

DUMP-BODY ASSEMBLY AND ATTACHING MEANS
FOR COMPLEMENTARY TRACTOR

Filed Sept. 30, 1954

INVENTOR
CLARENCE R. HAGEN

ATTORNEY

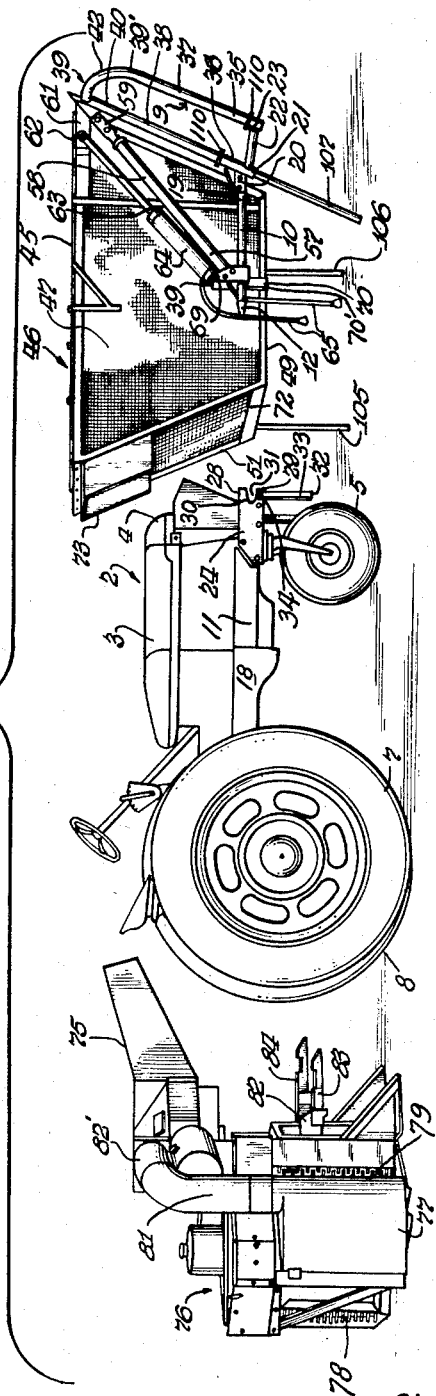

United States Patent Office 2,947,571
Patented Aug. 2, 1960

2,947,571

DUMP-BODY ASSEMBLY AND ATTACHING MEANS FOR COMPLEMENTARY TRACTOR

Clarence R. Hagen, Memphis, Tenn., assignor to International Harvester Company, a corporation of New Jersey Filed Sept. 30, 1954, Ser. No. 459,475

11 Claims. (Cl. 298—10)

This invention relates to mounting structures for adapting cotton harvesters to conventional agricultural tractors or similar vehicles.

The usual agricultural tractor is designed for use in propelling and partially or wholly supporting numerous machines and implements, but as a rule is not ordinarily intended for superposition thereon of large harvesting units such as cotton pickers.

For the past decade cotton pickers have been principally developed for the large operator and either featured a single purpose self-propelled unit wherein the various components were built into a unitary structure or the ordinary tractor has been provided with conversion mechanism requiring extensive alteration of the basic tractor that for all intents and purpose, the converted tractor became a special carrier for the cotton harvester and the operator in lieu of reconverting it into an ordinary tractor would normally not disassemble the combination after a harvesting season but keep it especially for the cotton harvester. Of course, this practice is economically sound for a large operator whose principal crop is cotton, but is entirely unsatisfactory for the small farmer with a variety of crops and which require the tractor for ready attachment for various different implements.

In order to provide for the small farmer, it is essential to maintain the tractor in conventional form and the cotton harvester so designed that it may be readily mounted and removed with respect to the tractor.

Therefore, it is a general object of the invention to provide a novel cotton picker adapted to be quickly connected and disconnected relative to a conventional agricultural tractor with adequate consideration being given to stability of the tractor in the field, proper arrangement of the components of the harvester on the tractor to obtain not only a proper weight distribution, but also efficiency in operation and compactness of design and so that the tractor with the cotton harvester mounted thereon is relatively easy to maneuver and operate.

It is well understood that in agricultural tractors, the rear axle structure is more suitable to carry the heavy loads and that the front end of the tractor should be relatively lightly loaded so that it is easier to control. In this connection, it is an object of the present invention to locate the cotton picker component rearwardly of the rear axle in counterbalancing relation to the cotton receptacle which is positioned ahead of the rear axle and at the side of the tractor opposite that of the cotton picker to obtain lateral balance.

Another object of the invention is to provide a novel auxiliary framework for supporting the picker basket in a low position just above the cotton plants so as to obtain a low center of gravity and at the same time provide a high pivot point about which the basket is to be rotated for dumping into a wagon box and to arrange this pivot on an axis generally parallel to the rear axle structure so that when the basket is elevated with the load of cotton it will be balanced across the strongest part of the tractor and without imposing excessive weight on the tractor front steering wheel assembly.

A still further object is to provide a novel readily disconnectible attachment for the tractor to the cotton picker which accommodates separation simply by unlatching the connection and moving the tractor and the basket longitudinally, the picker and tractor being similarly connected and separable.

A further object is to design the basket and support framework so as to obtain maximum basket capacity and also facilitate dumping from the front end of the tractor-harvester combination by angling the front side of the basket and downwardly and rearwardly from the upper forward end of the basket to provide an accommodation space beneath the forward upper end of the basket for a wagon box.

These and other objects of the invention will become more apparent from the specification and the drawings, wherein:

Figure 7 is a side elevational view showing a side elevational view of the tractor, the picker unit and basket separated.

Figure 3:
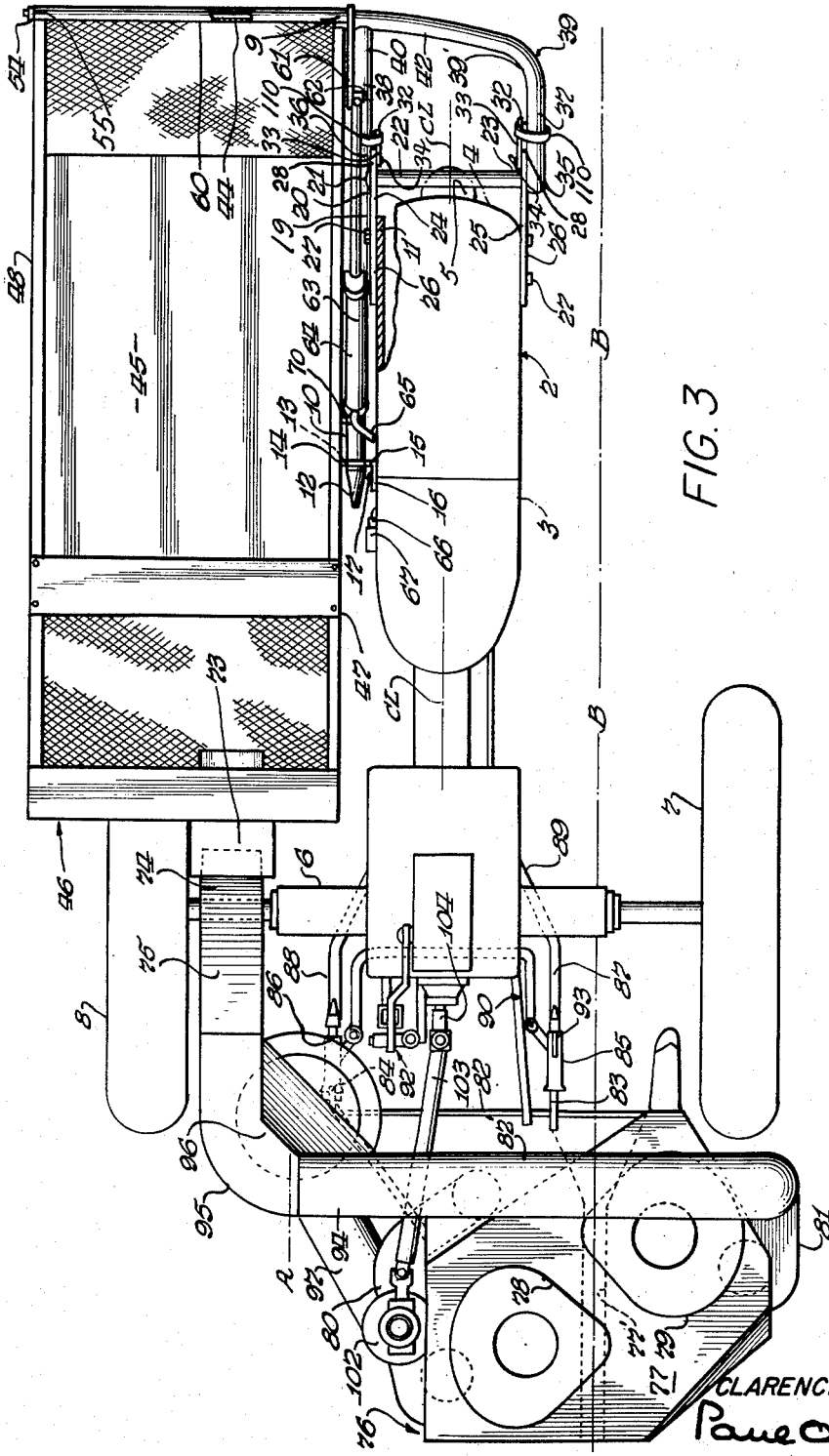
Figure 3 is a plan view thereof.
Figure 4:
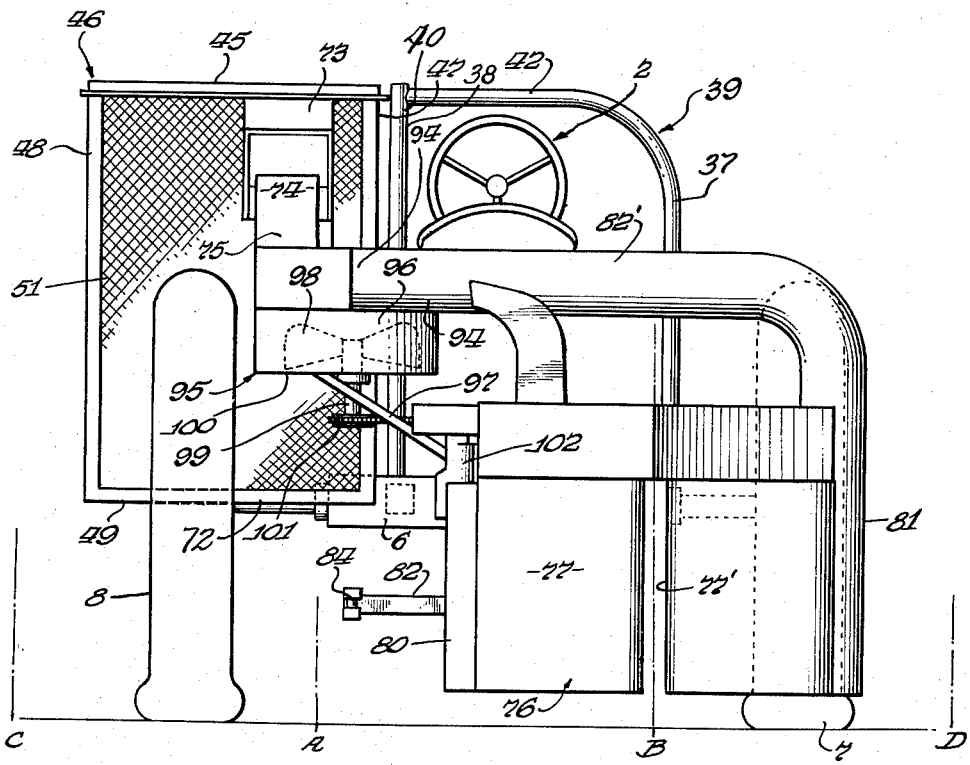
Figure 4 is a rear end view thereof.
Figure 6:
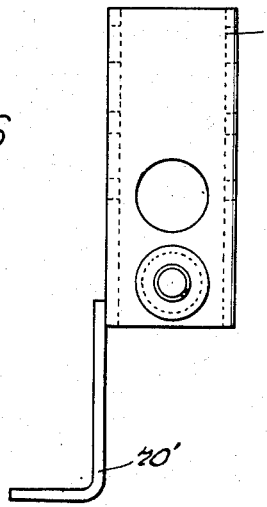
Figure 6 is an enlarged front view of the basket support.
Figure 5:
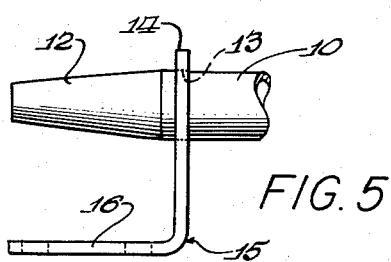
Figure 5 is an enlarged plan view of the mounting for the rear end of the basket frame support beam.

The invention is shown in association with an agricultural tractor generally indicated 2, and comprising a narrow fore and aft extending body or frame structure or chassis 3 having a front end part 4 with a sustaining front steering truck 5, the body being centered on the center line CL—CL between left and right rows of cotton indicated A and B in Figure 3. The rear end part of the tractor body is integrally connected to a transverse rear axle structure 6 which journals right and left large traction wheels 7 and 8 which are adapted to straddle and travel respectively closely along the right and left-hand sides of the two rows A and B. The tractor is provided along the lateral left and front sides thereof with a basket or cotton receptacle mounting frame or dump body attaching means generally indicated 9 which comprises an elongated frame beam member or frame portion 10 extending in a fore and aft direction along the side sill 11 of the tractor body and having a pointed rear end or extremity 12 which is entered through a socket or a fore and aft extending opening 13 in a vertical outwardly extending flange or plate 14 of a mounting bracket or mounting means 15 which comprises a mounting flange 16 formed integral with the flange 14 and extending generally parallel to the side sill 11 and adapted for connection by means of bolts 17 to an adjacent rear portion of the tractor body, normally, the clutch housing 18.

The forward end or extremity 19 of the beam 10 projects in front of the forward extremity on part of the tractor body and is connected through a gusset plate assembly 20 with one end 21 of a cross-beam member or element 22 which extends with the member 10 in a substantially horizontal plane. The beam on portion 22 projects transversely of the tractor body at approximately the level of the side sills and adjacent to opposite ends 21 and 23 is detachably supported by brackets 24 and 25 from the forward part of the tractor.

Each bracket or spaced mounting means 24 and 25 is identical in construction and comprises a plate 26 which is attachable by means of bolts 27 to the adjacent sill member 11 in an upright plane, the plate extending forwardly of the tractor flatwise in a fore and aft direction and having upper and lower vertically spaced ears or lugs or projections 28 and 29 which define a horizontally elongated slot 30 with a forwardly open end 31 adapted to receive the transverse bar 22 therein coincident with the insertion of the rear extremity 12 of member 10 through the opening 13 attendant to mounting the frame 9 on the tractor.

Each bracket 24 and 25 has a latch 32 associated therewith for securing the crossbar, the latch comprising an elongated bar assembly 33 pivoted on a horizontal pin 34 to the lower lug 29 of the bracket and adapted to be swung upward across the lugs 29 and 28 in closing relation to the forward end 31 of the slot to retain the bar 22.

The ends 21 and 23 are connected to the lower ends 35 and 36 of upright beams 37 and 38 of the supplementary frame or frame portion generally indicated 39, the elements 37 and 38 extending upwardly and forwardly from member 22 in a diagonal transverse plane as respects to centerline CL—CL of the tractor.

Figure 2:
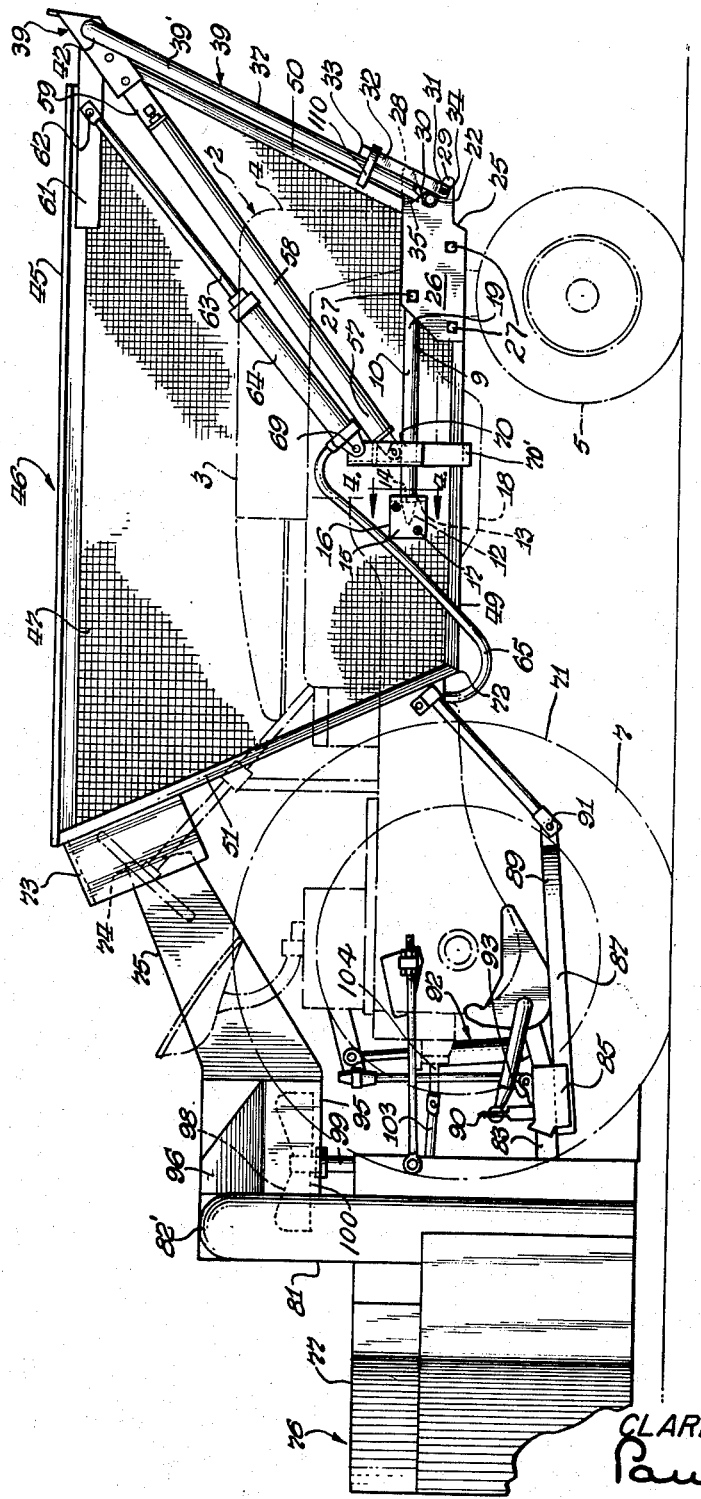
Figure 2 is a side elevational view of the combination with the tractor shown in phantom lines.

The upper ends 39' and 40 are connected to a transverse beam member or bar 42 which extends generally parallel to the beam 22. In the present illustration the portion of the bar 42 between the upper ends 39' and 40 is formed as an arcuate continuation of the beam 37 and projected as an extension 44 laterally outwardly leftward of the left upright beam member 38 which is located generally in the vertical plane of the longitudinal beam 10. This pivot portion 44 is disposed a substantial distance above the top of the tractor and forwardly of the bottom frame member 22 and thus as best seen in Figure 2 defines below the pivot member 44 a wagon box accommodation space whereat a wagon box may be disposed to receive cotton from the forward end of the upper side 45 of basket 46 which is elongated in a fore and aft direction and having spaced vertical fore and aft extending inboard and outboard sides 47 and 48 disposed respectively along the member 10 and outwardly of the left wheel 8 in a vertical plane between the row A and a row C immediately leftward of row A. The basket has a generally horizontal bottom 49 which is disposed at a level of about the rear axle structure to generally pass over the cotton plants, and the bottom interconnects the lateral sides and the front and rear sides 50 and 51 of the basket which converge downwardly, the front side generally paralleling the plane of the auxiliary frame structure 39 behind a diagonal beam element 52 of the structure 39 and which has an upper outer end 53 bolted as at 54 to the outward end 55 of the extension 44 and extending diagonally downwardly inwardly therefrom and connected at its lower end 56 through the gusset plate 20 to the forward end of beam 10 and the leftward end 21 of the transverse beam 22.

The beam 10 is connected at its forward end to the frame portion 39 intermediate its ends. The beam 10 is connected intermediate its ends to the lower rear end 57 of an upwardly and forwardly extending supplemental beam 58 which has an upper end flat plate portion 59 connected as by welding to the inboard end of the extension 44 whereby the members 58, 38 and 10 lie in a common vertical fore and aft extending plane.

Figure 1:
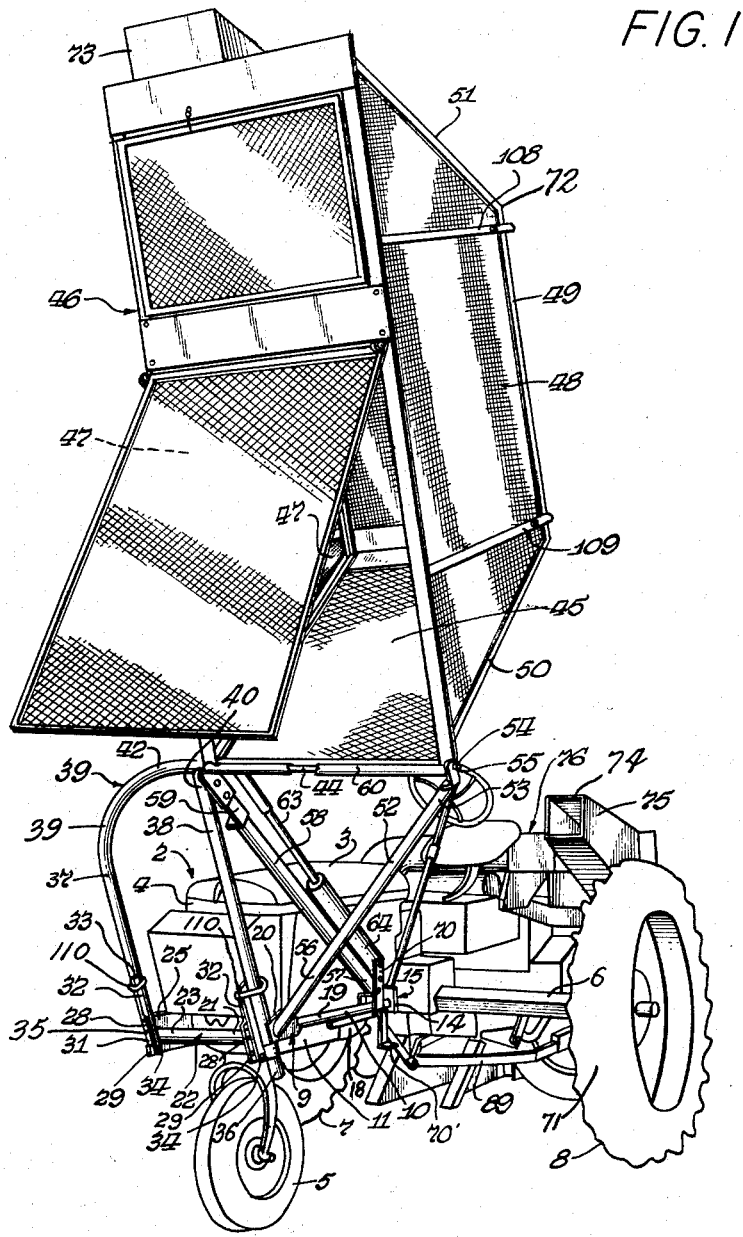
Figure 1 is a front perspective view of the tractor-harvester combination showing the basket in dumping position.

The basket or dump body is provided at the upper end of its forward side with a sleeve 60 which telescopes over the extension 44 and affords a pivot for the basket as best seen in Figure 1 on a generally horizontal axis forwardly of the tractor and substantially parallel to the axis of the rear traction wheels 7 and 8. Thus the basket extends rearwardly of the frame part 44, and beam element 52 of the transverse frame portion 39.

The basket or receptacle is provided with a rearwardly extending lever arm 61 which is pivoted at 62 to the upper end of a diagonally downwardly and rearwardly extending hydraulic motor 63 in the form of a one way piston and cylinder arrangement with the cylinder 64 provided with an hydraulic conduit 65 which has a quick detachable connection at 66 to an hydraulic power source 67 of the tractor as will be readily understood by those skilled in the art. The cylinder is pivoted as at 69 to an upstanding lug structure 70 connected to the member 10 intermediate its ends as best seen in Figure 2, said structure 70 having a depending hook 70' for supporting the basket.

The rear side of the basket extends diagonally downwardly and forwardly from a point above the left wheel 8 to a point in front of its forward side 71 and the angle of inclination is so chosen that the bottom rear corner 72 of the basket just clears said forward side of the left wheel upon actuation of the hydraulic motor and upward and forward swinging of the basket for dumping as seen in Figure 1.

The upper end of the rear side of the basket is provided with a rearwardly projecting inlet duct 73 communicating with the interior of the basket and telescoped over the forward and upper end 74 of a conveyor conduit 75 of a cotton picker unit 76 which is substantially identical with that shown in U.S. Patent #2,140,361.

Generally the picker incorporates a housing 77 which is located behind the rear axle structure rightwardly of the center line CL—CL between the same and the right wheel 7 is lateral counterbalancing relation to the basket which is located on the left side of the tractor body and in force and after counterbalancing relation therewith across the rear axle structure.

The housing provides a fore and aft throat or plant passage 77' aligned with the cotton plant row B and at opposite sides of the throat the picker has a pair of picker drums 78 and 79 diagrammatically shown in Figure 3 which are adapted to pick the cotton respectively from the left and right-hand sides of row B. These picker drums discharge the cotton to left and right-hand conduit branches 80 and 81 which are disposed at the left and right sides of the housing. The conduit branch 80 is disposed just to the right of the plant row A and the conduit branch 81 behind the right wheel 7 between the row B and the next row D rightwardly thereof.

The housing is provided with a draft frame 82 which incorporates a pair of forwardly projecting hitch elements 83 and 84, the right hitch member 83 is disposed at the left-hand side of the inlet end of the plant passage 77' and the left hitch member 84 is disposed just to the right of row A. These hitch members telescope into mating sockets 85 and 86 on the rear ends of the legs 87 and 88 of a bail member 89 of a quick hitch linkage generally designated 90. The legs 87 and 88 converge forwardly and extend respectively along the left and right-hand sides of the rows B and A and provide means for brushing the plants of said rows outwardly.

The hitch per se forms no part of the present invention but is claimed and described in U.S. Patent 2,776,613, and for present purposes may be generally described as having a pivotal support 91 for the front end of the bail from the tractor and a lifting and lowering mechanism generally indicated 92 and connected to the rear ends of the legs of the bail and the tractor for adjusting the bail vertically.

It will be apparent that the harvester unit is attached and disconnected relative to the hitch by relative fore and aft movement between the tractor and the unit, the hitch members being releasably locked in the sockets by the locks 93 as described in said patent.

The conveyor branches 80 and 81 connect at their upper ends to a main duct 82' which overlies the housing and extends to the inlet 94 of a blower fan or pneumatic motor 95 which incorporates a housing 96 carried on an extension 97 connected to the upper portion of the housing and extending outwardly from the left side thereof at a level substantially above that of the rear axle structure and over plant row A. The blower incorporates a fan 98 having a vertical shaft 99 journalled on a bottom wall 100 of the fan housing and provided with a sheave 101 which is chain driven from a gear box 102 mounted on the upper left hand side portion of the housing just to the left of the centerline CL—CL of the tractor in order to provide an approximately straight fore and aft telescoping shaft drive 103 from the tractor power take-off 104 on the centerline CL—CL to the gear box 102 which also drives the picker components substantially as described in said Patent #2,140,631.

The outlet end of the fan housing is continued into the beforementioned conduit portion 75.

It will be noted that the disposition of the picker unit rearwardly of the rear axle structure and the attachment thereof to a vertically movable hitch permits the operator not only to adjust the height of the unit, but also raising it off the ground in counterbalancing relation to the basket especially when it is in dumping position as shown in Figure 1.

As seen in Figure 7 wherein the parts are indicated separated, the basket is provided with several jacks 105, 106 and 107 which are extensible in order to support the basket and the frame work in the position shown for storage or assembly. The jack members 105 and 106 telescope into pipes 108 and 109 fastened to the outboard side of the basket and the member 107 telescopes into the hollow bar 38. It will be understood that each of these members 105, 106 and 107 is held in its extended or retracted position by means of a set screw.

It will be seen from the consideration of Figures 1, 2 and 3 that the latch bars 32 are maintained in locked position by means of the loops 110 on the bars 37 and 38, which loops are slidable lengthwise of these bars.

What is claimed is:

1. The combination of a tractor having a chassis with front, rear and lateral sides, spaced mounting means on the front of the tractor, additional mounting means on one of lateral sides of the tractor spaced longitudinally of the tractor with respect to said spaced mounting means, a dump-body-attaching means comprising a first frame adjacent the front of the chassis and a second frame adjacent said one side of the chassis and rigidly connected to said first frame, means connecting said first and second frames to said spaced mounting means and additional mounting means respectively, and a dump body pivoted at one end to said first frame adjacent to said front and on an axis transversely of the tractor.

2. The invention according to claim 1, and said dump body comprising a basket disposed in transverse alignment with said one side of the tractor and having a bottom adjacent said chassis.

3. The invention according to claim 1, and said first frame comprising a bottom member extending between said spaced mounting means, and supporting structure extending upwardly from said bottom member and having an upper portion projecting in front of said end of the dump body and providing said pivot for said dump body.

4. The combination of a tractor having a chassis with front, rear and lateral sides, first mounting means on the front side of the tractor, second mounting means on one side of the tractor spaced rearwardly from said first mounting means, a dump-body-attaching means comprising a first frame adjacent the front of the tractor and a second frame alongside said one side of the tractor and rigidly connected to the first frame, means connecting said first and second frames to said first and second mounting means respectively, and a dump body adjacent said second frame, means pivotally supporting said dump body from said attaching means adjacent to the front and transversely of the chassis.

5. The invention according to claim 4 and said first mounting means comprising a pair of spaced brackets projecting forwardly from said front side of the chassis and having forwardly open notches admitting a portion of the first frame therein, and latches on the brackets swingable behind said portion of the first frame for closing respective notches, and locking means on the first frame engageable with respective latches for holding the latches in latching position.

6. The invention according to claim 4, and said second mounting means comprising a bracket extending outwardly from said one side of the tractor and having a forwardly facing socket receiving a projecting portion of the second frame therein.

7. The invention according to claim 4, and said dump body comprising a container having front and rear sides respectively adjacent to the front and rear sides of the chassis and having a lateral side opposing the one side of the chassis, and said second frame located between said one side and opposing side.

8. An attaching structure for mounting a dump body on a tractor comprising a first frame and a second frame, said first frame rigidly connected intermediate its ends to one end of the second frame, a dump body at one side of the second frame and having an end behind one portion of said first frame at the one side of the second frame, means pivotally mounting said body from said one end thereof on said one portion of the first frame, and tractor-mounting means on another portion of said first frame and on said second frame.

9. The invention according to claim 8, and said second frame having supporting means extending under the dump body in supporting relation thereto.

10. The invention according to claim 8, wherein said first frame is disposed perpendicular to the second frame.

11. The invention according to claim 8, and said first frame comprising a bottom member and a pair of laterally spaced members rigidly connected at their lower ends to the bottom member at spaced areas, and an upper part extending from one of the spaced members to the other spaced member and beyond and forming said one portion of the first frame.

References Cited in the file of this patent

UNITED STATES PATENTS

| | | |
|---|---|---|
| 1,725,624 | Dixon | Aug. 20, 1929 |
| 1,773,496 | Osman | Aug. 19, 1930 |
| 1,985,373 | Johnston | Dec. 25, 1934 |
| 2,023,491 | Rust et al. | Dec. 10, 1935 |
| 2,088,676 | White | Aug. 3, 1937 |
| 2,214,818 | Johnston | Sept. 17, 1940 |
| 2,234,599 | Johnston | Mar. 11, 1941 |
| 2,413,873 | Hume | Jan. 7, 1947 |
| 2,518,317 | Hilblom | Aug. 8, 1950 |
| 2,527,369 | Meyer | Oct. 24, 1950 |
| 2,558,951 | Hagen et al. | July 3, 1951 |
| 2,628,729 | Borchers | Feb. 17, 1953 |
| 2,672,247 | Jemett | Mar. 16, 1954 |
| 2,697,005 | Hagen et al. | Dec. 14, 1954 |
| 2,719,394 | Thomann et al. | Oct. 4, 1955 |

FOREIGN PATENTS

| | | |
|---|---|---|
| 673,096 | Great Britain | June 4, 1952 |